A. TAPLIN.
MACHINE FOR WASHING ORANGES.
APPLICATION FILED JUNE 5, 1906. RENEWED SEPT. 2, 1909.
937,970.
Patented Oct. 26, 1909.
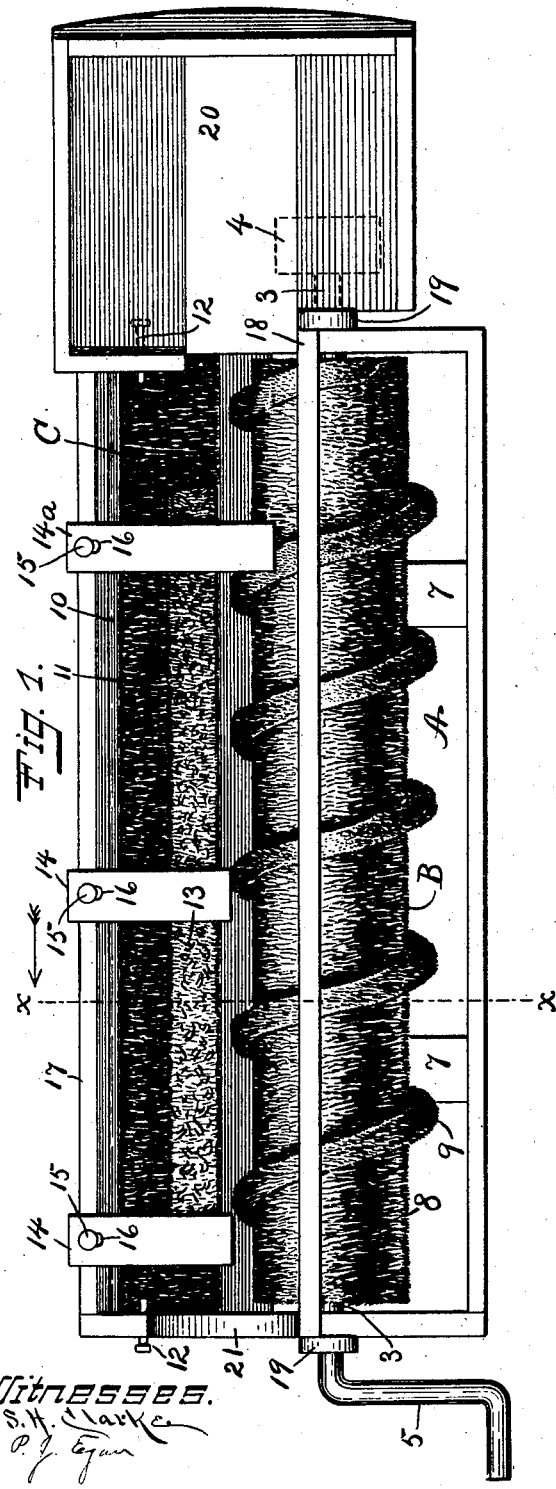
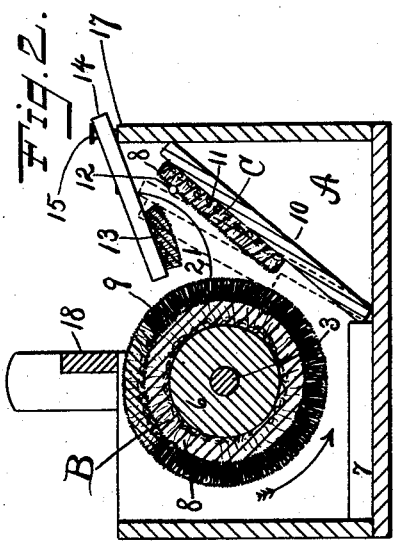

UNITED STATES PATENT OFFICE.

ALVIN TAPLIN, OF FORESTVILLE, CONNECTICUT.

MACHINE FOR WASHING ORANGES.

937,970.

Specification of Letters Patent.  Patented Oct. 26, 1909.

Application filed June 5, 1906, Serial No. 320,297.  Renewed September 2, 1909.  Serial No. 515,909.

*To all whom it may concern:*

Be it known that I, ALVIN TAPLIN, a citizen of the United States, residing at Forestville, in the county of Hartford and State of Connecticut, have invented certain new and useful Improvements in Machines for Washing Oranges, of which the following is a specification.

My invention relates to improvements in machines for washing oranges and other objects having a somewhat spherical form, and the object of my improvement is to produce a machine that is efficient and rapid in operation, and which is particularly adapted for being driven by power for passing the oranges quickly through the machine.

In the accompanying drawing:—Figure 1 is a plan view of my machine. Fig. 2 is a sectional view of the same on the line x x of Fig. 1.

A, designates a tank or trough which also serves as the frame of the machine. This tank or trough is made tight and is designed for holding the water for washing the oranges. The brush cylinder B, is provided with a shaft or gudgeons 3, by means of which the brush cylinder is mounted in the ends of the tank. I prefer to mount the cylinder substantially horizontal or level, and to provide one end with a driving pulley 4, shown by broken lines in Fig. 1, for the application of a belt for driving the machine by power from any suitable source. The other end may be provided with a crank 5 for turning the brush cylinder by hand when desired. I prefer to form the brush cylinder of a core or roller 6 of wood, covered with cocoanut matting to form a cylindrical brush, the said matting being constructed in the ordinary manner from cocoanut fiber with a braided or woven body portion, and brush portion 8 with a surface of radially projecting fibers. This may be wound around the wooden roller and secured thereon in any proper manner with the body next to the roller and the brush portion radiating therefrom so as to form a brushing cylinder. A long narrow strip of the same material with a like brush surface is then wound spirally around the outside of the brushing cylinder at an inclination of about thirty degrees to the axis of the cylinder, so as to form a screw or worm 9 as shown, and secured in place thereon in any proper manner with its body next to the brush cylinder and its brush portion on the outer side. The cylinder and worm together constitute one brush or brushing roller.

In connection with the brush cylinder and worm I employ a second brush or brushing apron C. I prefer to form this apron of a board 10 and brush 11 of cocoanut matting, and also to make the apron adjustable for large or small oranges. As shown, the apron board 10 is made wide enough to extend down to the bottom of the tank and to extend upwardly on an incline by the side of the brush cylinder or worm so that the confronting faces of the cylinder and apron form a trough or run for the oranges when they are being washed, but which they cannot fall through. The lower end of the apron board is prevented from slipping down under the brush by means of a suitable stop or stops 7, on the bottom of the tank. The upper edge of the apron board 10 when arranged for large oranges, rests upon one side, 17, of the tank, as best shown in Fig. 2. When desired to set the machine for washing small oranges, the top of the apron board may be moved toward the brush cylinder into the position indicated by broken lines in Fig. 2, where it may be held by the pins 12.

If desired, a third brush may be employed in connection with the brushing cylinder and worm and the brushing apron. In such case I form the third brush 13 of a strip of cocoanut matting which is secured to two or more swinging arms 14, loosely supported on the tank or frame. As shown, this third brush is merely secured brush side down to the under faces of the arms 14, and the said arms are supported in place by means of headed pins 15 which pass through slots 16 in said arms into the upper edge of the material that forms the side 17 of the tank. If the portion of the pins 15 between the under side of the head and the upper edge of the side 17 is longer than the arms 14 are thick, then the said arms will be free to vibrate or swing on the said pins within certain limits so as to permit the third brush to move up and down. As shown in Fig. 2 the third brush is depressed to the full downward limit of the movement of the arm 14. I have shown two arms 14 of the same length and so short that no part of the brush cylinder or worm can come in contact therewith. I prefer to employ a longer arm 14ª, which is not quite long enough to come in contact with the cylindrical part of the roller brush but which is long enough to reach the worm 9 and to be hit thereby at every revolution of the cylinder, whereby the third brush will be raised up slightly and dropped down again every time that the worm acts on the arm 14ᵃ to raise it, and then passes on out of the way of the said arm. The strips for the worm and the third brush may be cut from wider matting or they may be braided or woven of the desired width especially for this work.

If desired a longitudinal guard bar 18 may be placed over the brushing cylinder and supported by the brackets 19 whereby the said bar will prevent the oranges from passing over the top of the roller into the tank. For convenience of feeding the oranges into the machine, any suitable hopper 20 may be provided. A suitable recess 21 is cut in the end portion of the tank directly in front of the working space between the roller and apron, for the passage of the oranges out of the machine. The third brush is made shorter than the brush cylinder and apron in order to facilitate the entry of the oranges between the brushes and their exit therefrom.

In use, the tank will be filled and should be kept filled with water to a depth that will cover the under side of the brush cylinder, whereby both the worm and the cylinder within the worm will be kept wet. Oranges are fed into the machine from the hopper to the space between the brush cylinder and apron and the brush cylinder is turned in the direction indicated by the dart in Fig. 2, so that the side of the roller that faces the apron is moving upwardly and toward the guard bar 18. The motion of the roller has a tendency to roll the oranges over and over, so that they are brushed and scrubbed on one side by the roller and on the opposite side by the apron, the water from the roller keeping the oranges wet and through the oranges wetting the apron also. The worm brush also acts on the oranges with a tendency to lift them and roll them along toward the delivery end of the machine. In thus moving along they pass under the third brush which brushes them on the top. The up and down motion given to the third brush by the worm and longer arm 14ᵃ facilitates the entry of the oranges under the third brush and their passage thereunder. As the oranges reach the delivery end of the machine they are forced out by the worm. The worm being also a brush, serves to assist the scrubbing process while it does the feeding. The oranges are thus forced rapidly through the machine and at the same time they are efficiently brushed or scrubbed. The adjustment of the apron to adapt the machine for large or small oranges has been before explained. Inasmuch as the machine is designed to be generally driven by power, the brushing roller is not set on a slant to make the oranges roll by gravity through the machine, but is set level and the oranges are brushed or forced out by the brushing worm, and it is believed that the oranges will be cleaned better when they are brushed out than they will when they merely roll out.

I claim as my invention:—

1. In an orange washer, the combination of a tank having a delivery opening at one end with a brushing cylinder mounted on the said tank for rotating therein, a brushing worm wound around and secured to the said cylinder for rotating therewith, and an upwardly inclined brushing apron within the said tank by one side of the said cylinder and worm with their confronting faces diverging from each other in the form of a trough and with one end of the said trough leading to the said delivery opening, all combined and operating together for simultaneous action on the oranges of the said three brushing devices.

2. In an orange washer, the combination of a frame having a delivery opening at one end with a cylinder having a brushing surface consisting of radially arranged fibers a worm mounted thereon and having a brushing surface consisting of outwardly projecting fibers, and an upwardly inclined brushing apron having a like surface arranged to face the said cylinder and worm with their confronting faces diverging from each other in the form of a trough and with one end of the said trough leading to the said delivery opening, all combined and operating together for simultaneous action on the oranges of the said three brushing devices.

3. In an orange washer, the combination of a tank with brushing cylinder mounted therein a brushing apron arranged upon an upwardly inclined board by the side of the said cylinder and adapted to be tilted to and from the said cylinder, and means for holding the said apron in position when thus tilted to vary the distance between the said apron and cylinder.

4. In an orange washer, the combination of a tank with a brushing cylinder mounted on the said tank for rotating therein, an upwardly inclined apron board arranged by the side of the said cylinder within the said tank and fulcrumed at its lower edge, a brushing apron mounted on the said board and facing the said cylinder, and means for holding the said apron board at varying distances from the said cylinder when the apron board is changed in position on its fulcrum.

5. In an orange washer, the combination of a rotary brushing cylinder with a brushing worm mounted thereon, a brushing apron by the side of the said cylinder and a third brush mounted on vibrating arms, one of which is adapted to be engaged by the said worm for lifting the third brush at each revolution of the said cylinder.

6. In an orange washer, the combination of a tank with a brushing cylinder mounted on the said tank for rotating therein, a brushing worm wound around and secured to the said cylinder for rotating therewith, an upwardly inclined brushing apron within the said tank by the side of the said cylinder and worm with their confronting faces diverging from each other in trough like form, and a guard bar over the said cylinder in position to prevent the oranges from passing over the top of the cylinder into the tank.

7. In an orange washer, the combination of a brushing cylinder with a frame upon which said brushing cylinder is mounted, an upwardly inclined brushing apron by the side of the said cylinder, a third brush extended continuously lengthwise over the space above the said cylinder and apron, and swinging arms loosely mounted on the said frame and secured to the said third brush at different points in its length for supporting it in position over the said space.

ALVIN TAPLIN.

Witnesses:
   T. J. BROOKS,
   PERRY R. CURRY.